May 16, 1944.   M. SORKIN   2,348,862
REGISTRATION CONTROL APPARATUS
Filed Feb. 27, 1940   4 Sheets-Sheet 1

INVENTOR
MORRIS SORKIN
BY Francis H. Betz.
ATTORNEY

May 16, 1944.  M. SORKIN  2,348,862
REGISTRATION CONTROL APPARATUS
Filed Feb. 27, 1940  4 Sheets-Sheet 2

INVENTOR
MORRIS SORKIN
BY Francis H. Behr
ATTORNEY

May 16, 1944. M. SORKIN 2,348,862
REGISTRATION CONTROL APPARATUS
Filed Feb. 27, 1940 4 Sheets-Sheet 3

INVENTOR
MORRIS SORKIN
BY Francis H. Beke
ATTORNEY

May 16, 1944.   M. SORKIN   2,348,862
REGISTRATION CONTROL APPARATUS
Filed Feb. 27, 1940   4 Sheets-Sheet 4

INVENTOR
MORRIS SORKIN
BY
ATTORNEY

Patented May 16, 1944

2,348,862

UNITED STATES PATENT OFFICE 2,348,862

REGISTRATION CONTROL APPARATUS

Morris Sorkin, New York, N. Y., assignor, by mesne assignments, to The Fred Goat Co., Inc., Brooklyn, N. Y., a corporation of New York Application February 27, 1940, Serial No. 321,056

18 Claims. (Cl. 271—2.6)

This invention relates to high speed multiple operations on moving webs of sheet material, and particularly to an improved apparatus for automatically maintaining all of the multiple operations in register with one another.

In multicolor rotogravure printing, for example, each color is applied by a separate printing unit operating on a continuous web, and it is essential to maintain accurate registration between the various colors. If the printing operation is combined with a cutting operation, as in the printing of labels, it is likewise essential to have the printed matter properly positioned with respect to the lines of cut. Due to the speed at which the web travels, it is not possible for the human eye to follow it for a sufficient length of time to check the registration. Accordingly, various suggestions have been made for indicating when the web is out of register, and for making any necessary corrections automatically.

Among the many suggestions that have been advanced, it has been proposed that register may be automatically corrected with apparatus including a photoelectric cell which is actuated in response to a target or other indicia applied to the web, and associated with a rotating switch or commutator that is adapted to make proper connections for automatically correcting register in either a forward or reverse direction. Such apparatus, due to the inherent limitations on accuracy caused by the mechanical selector switch, cannot be used satisfactorily for multicolor printing for register should usually be maintained within 0.005 inch. Because of this, it was suggested that the required accuracy could be obtained by omitting the rotating switch and using a second photoelectric cell which was arranged to be actuated in response to the position of the printing cylinder or other rotating element operating on the web. While this form of apparatus has been widely used and is entirely satisfactory in operation, it too has certain limitations. For example, since the operation depends on the time interval between the impulses from the two photoelectric cells, it is necessary to reset the time tolerances for different web speeds. Moreover, there is always the danger that an actuation of the apparatus will be brought about by some of the regular printed matter on the web.

It is the principal object of my invention to provide an improved construction for indicating when the web is out of register and automatically making any necessary corrections, which construction will overcome all of the difficulties that have been encountered in the prior known types of register control apparatus. Another important object of my invention is to provide a registration control apparatus which, when once set in operation, will accurately maintain register regardless of changes in web speed. Other and more specific objects are: To provide a registration control apparatus which will permit limitation of the portion of each revolution in which the circuit is responsive to impulses from the web, and in which the space tolerance and synchronization of operating units may be adjusted while the press is in operation; and to provide photoelectric registration control circuits which may be operated from commercial power lines, are sensitive to printed targets of a wide range of colors, are independent of the amplitude of the photoelectric impulses over a wide range, and may be mounted in suitable compact housings that are easily adaptable to a wide variety of types of web operating units.

In accordance with my invention, these and other objects are attained by the provision of a photoelectric registration control apparatus comprising a first photoelectric cell which is adapted to receive impulses from a suitable target or other indicia applied to the moving web, a rotating disc or hollow cylinder mounted on the shaft of one of the rotating operating elements and having therein two slots spaced circumferentially and laterally from one another, and two photoelectric cells which are so arranged with respect to the slots and a suitable source of illumination that they will be alternately illuminated by light passing through said slots during a portion of each revolution of the cylinder. One of the slots and its associated photoelectric cell predetermines the forward limit of tolerance of the position of the engraved cylinder or other operating element while the other predetermines the rearward limit of tolerance of the position of said engraved cylinder or operating element; and I have provided suitable circuit means, associated with all of the photoelectric cells, for indicating and automatically making the desired or necessary correction in register when the impulse created by the photoelectric cell associated with the web is not properly spaced intermediate the alternate illumination of the photoelectric cells associated with the rotating disc or hollow cylinder; that is, a correction in register will be made when the photoelectric cell controlled by the web determines that the target or mark on the web is not within the desired forward and rearward limits of tolerance as predetermined by the other two photoelectric cells. Thus, by my invention, the occurrence or non-occurrence of corrections of register depends upon a phase relationship, and will be entirely independent of the speed of the web.

The above and other features, objects and advantages of my invention will become apparent upon consideration of the following detailed description of one practical embodiment of my invention and the accompanying drawings, in which.

Figure 5:
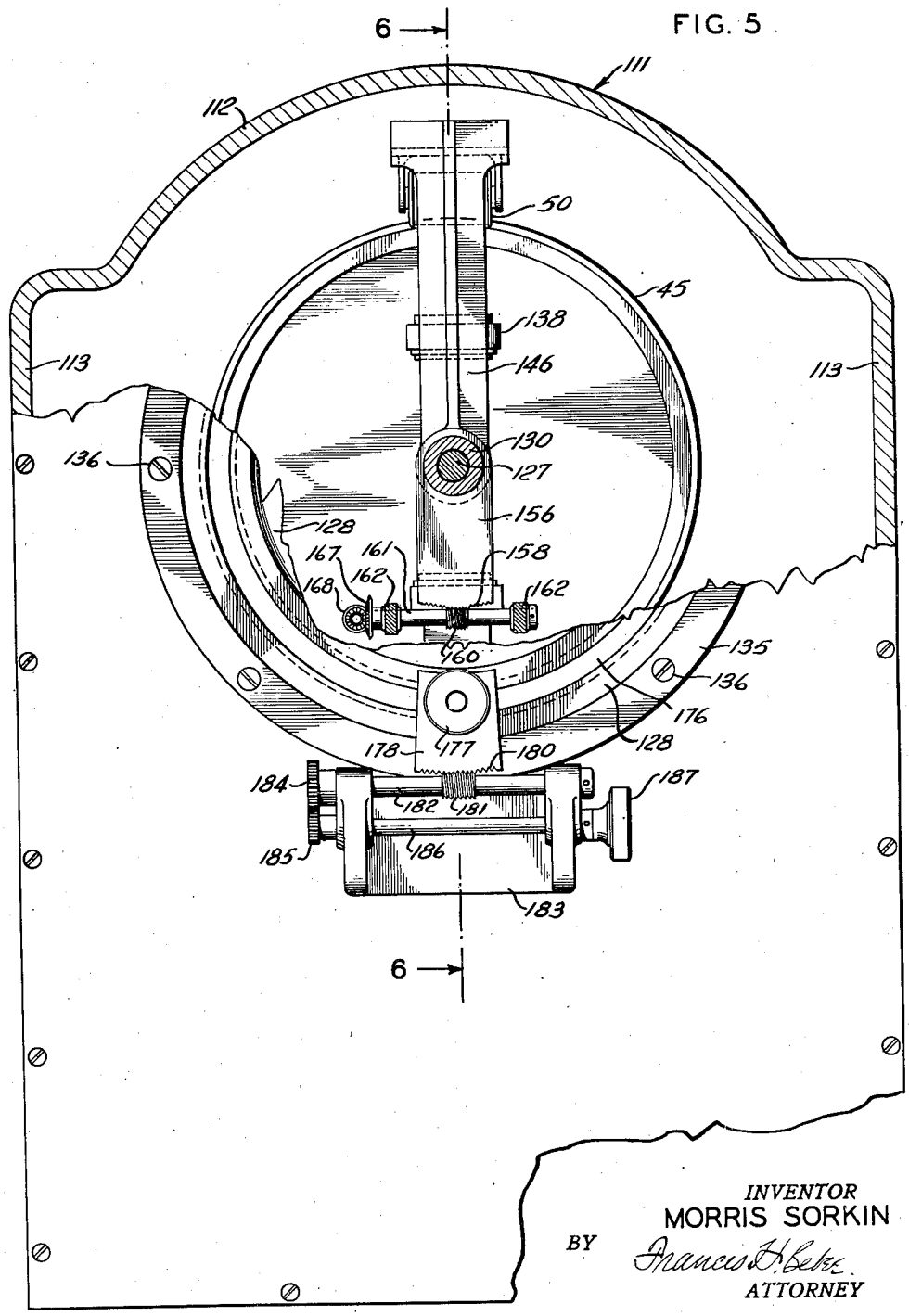
Fig. 5 is an end view of the photoelectric tolerance limit index associated with one of the rotating operating elements of the press.
Figures 6, 7, 8:
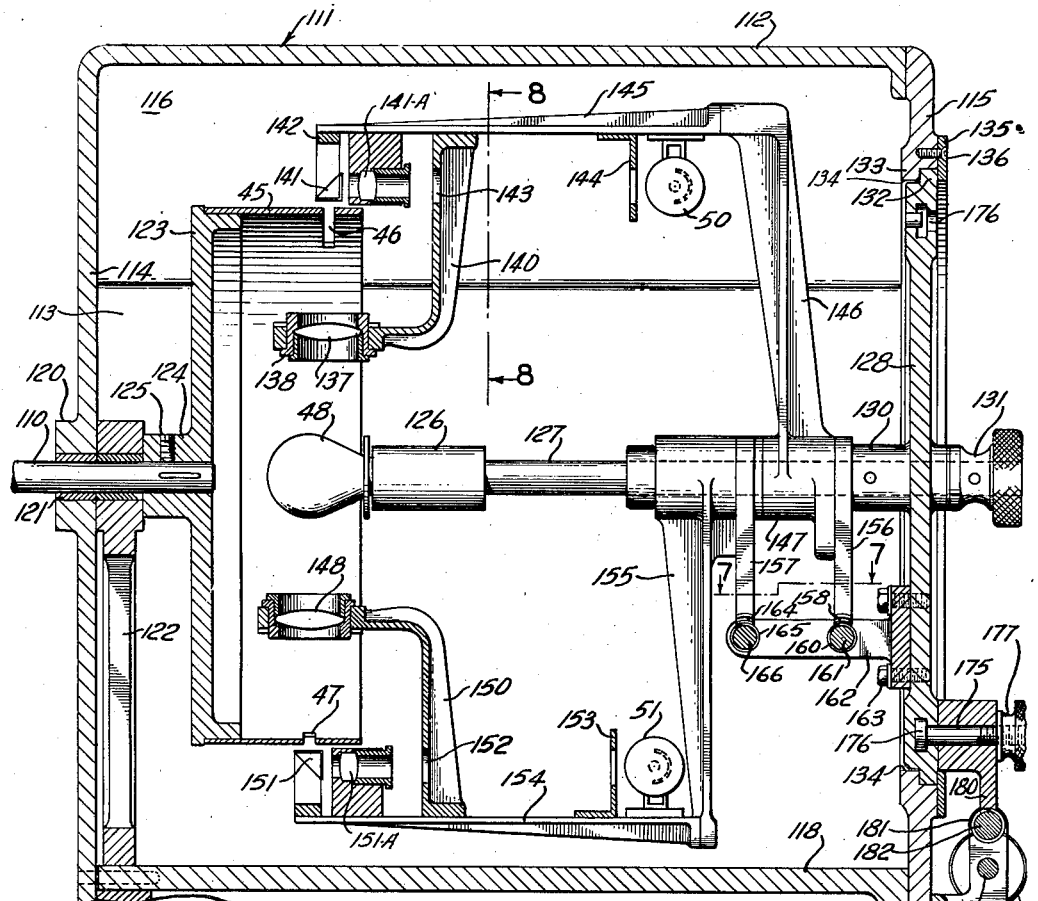

Fig. 6 is a vertical sectional view taken substantially along the line 6—6 of Fig. 5; and Figs. 7 and 8 are detail sectional views taken substantially along the lines 7—7 and 8—8, respectively, of Fig. 6.

In illustrating one form of my invention in the accompanying drawings, it has been shown applied to a multicolor rotogravure web printing press for controlling the register of the various colors applied by the respective printing units of the press. It will be understood, however, that the invention is not restricted in its use to such a multicolor printing press, but may be used generally in various types of printing presses and in other web operating units where it is necessary to maintain register in all of the operations.

Figure 1:
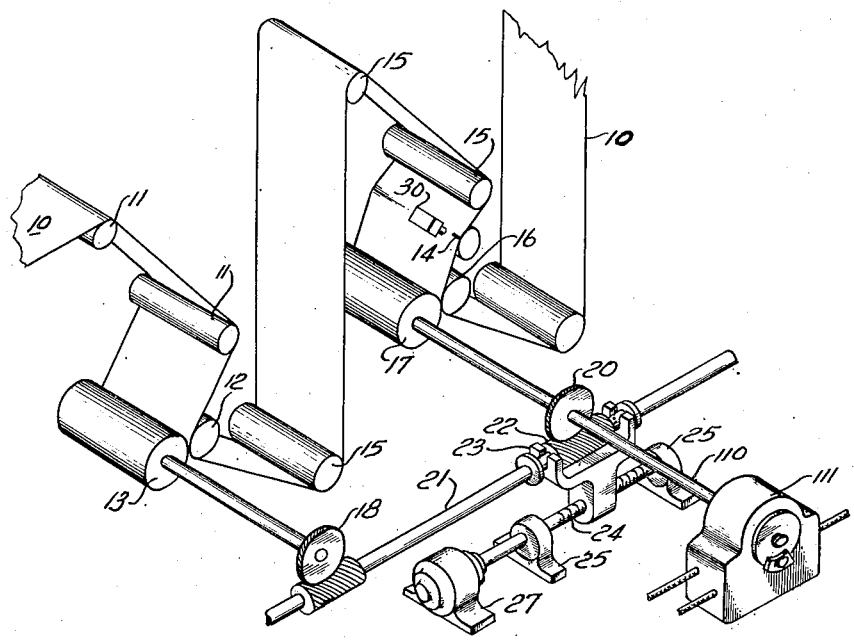
Fig. 1 is a fragmentary perspective view, largely diagrammatic, of a multi-color printing press in which my improved photoelectric registration control apparatus has been included.

Referring now to the drawings, it will be observed that a web of paper or other suitable material to be printed 10 is fed from a suitable source of supply (not shown) over suitable guide rollers 11, 11 to a first printing unit comprising an impression cylinder 12 and a printing cylinder 13. In this printing unit 12, 13 the web 10, on the underside thereof, as shown in Fig. 1, is printed with any desired markings. In addition to these markings, a suitable target or indicia 14 is also printed on the web. The web then passes over guide rollers 15, 15, 15 through a second printing unit comprising an impression cylinder 16 and a printing cylinder 17. The guide rollers 15 are positioned to provide a relatively long length of web after the first printing unit so that the first printed color may have an opportunity to dry before passing over and in contact with a guide roller surface. For satisfactory multicolor printing, it is essential that the printed impression applied in the second printing unit 16, 17 be in accurate registration with the printed impression applied by the first unit 12, 13. Thus, if through inaccuracies in feeding, shrinkage during drying or any other cause, the first printed impression does not arrive at the second printing unit 16, 17 in proper position to have the second impression applied in proper position thereover, some means should be provided for altering or varying the relationship between the web and the printing cylinder 17. This is accomplished in the construction which I have illustrated in Fig. 1 through the driving means associated with the printing cylinder. The shafts of the printing cylinders 13 and 17 are connected through suitable gearing 18 and 20, respectively, with a drive shaft 21 which is rotated at the desired speed. The gearing 20 includes a helical or worm gear 22 which is slidably but not rotatably mounted on the shaft 21 and adapted to be moved in either direction along the shaft by means of a suitable collar or yoke 23 which in turn is actuated or moved in either direction by means of a screw 24 rotatably mounted in a suitable bracket 25 attached to the printing press in any convenient manner. In order to turn the screw shaft 24 and thus impart, through the mechanism just briefly described, a forward or reversed increment of motion to the printing cylinder 17, said screw 24 may be connected through suitable gearing to a suitable reversible motor 27. In this way the engraved printing cylinder 17 may be moved to proper position with respect to the first printed impression on the web 10. This mechanism is shown and described more fully in W. F. Grupe Patent No. 2,163,035, dated June 20, 1939, and constitutes one desirable mechanical means of making the necessary adjustment when the web is out of register. However, adjustments in the relationship between the web and the operating element are also sometimes made by a movement of one of the guide rollers 15, and it will be apparent that the automatic features of my invention now to be described may also be used with such a construction.

Due to the fact that the web moves at a high rate of speed, it is not possible for the operator of the printing press to observe the condition of register of the printed impression. In order to indicate when the web is out of register and make any necessary correction, I have provided a web-scanning head for determining the position of the first applied impression upon the web 10 by an observation of the position of the register mark 14; and have also provided a photoelectric apparatus for determining the position of the engraved printing cylinder within the desired forward and rearward limits of tolerance. This mechanism, which will now be described in detail, is such that if the web-scanner determines that the register marks and the first printed impressions are within the desired limits of tolerance with respect to the impression which is to be applied by the second printing unit, no correction in register will be made or indicated. However, if the web scanner determines that the first applied impression is either advanced or retarded beyond the limits of tolerance, a corresponding correction in register will be effected through the reversible motor 27 and the associated mechanism which has been described above.

Figure 4:
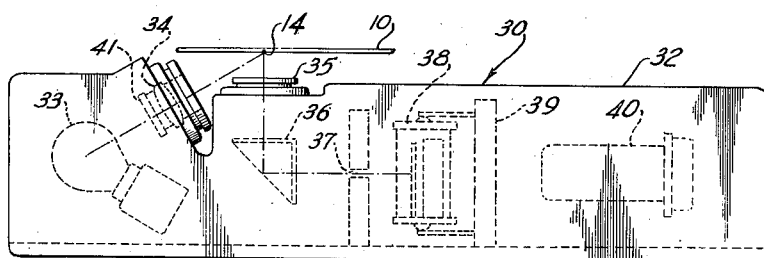
Fig. 4 is a side elevational view of the web scanning head.

As shown in Figs. 1 and 4, a scanning head 30 is arranged in any suitable manner above the second printing couple 16, 17 in a position to view the target or index mark 14 applied to the web 10 prior to its passing to said printing unit 16, 17. This scanning head comprises a suitable base 31 having a housing or cover member 32 mounted thereon. A light source, in the form of a conventional incandescent lamp bulb 33 is mounted within the housing and arranged to direct a beam of light through a lens 34 and upon the web 10 at the edge thereof and in line with the target 14. Light reflected from the web 10 is transmitted through a lens 35, a prism 36 and a slit or aperture 37 onto a photoelectric cell or other light sensitive member 38, which is mounted upon a suitable support 39 secured to the base 31. The lens 35 is adapted to form an image of the surface of the web on the plane of the slit or aperture 37 and therefore illuminate the photoelectric cell 38 with a quantity of light proportional to the reflectance of the web 10. The light source 33, the lenses 34 and 35, the prism 36 and slit or aperture 37 thus constitute an optical system which is adapted to effect a change in the light falling upon the photoelectric cell 38 each time that the target 14 passes. An amplifier tube 40 may also be mounted in the housing 32 if desired.

In the ordinary operation of multicolor printing, the first color printed, for example, by the printing unit 12, 13 may be yellow; and since the reflectance value in white light of the color yellow does not differ a great deal from the ordinary white or cream colored paper, it is difficult to effect a proper response to a yellow target on white paper with the ordinary scanning device of the general character.

This difficulty is increased by the fact that the ordinary photoelectric cell having a cesium surfaced cathode is not sensitive to light in the violet and blue spectral regions responsible for the contrast between the yellow target and white paper. However I have discovered that this lack of sensitivity may be overcome by employing a photoelectric cell having a rubidium surfaced cathode in a lime glass bulb, such a photoelectric cell being predominantly sensitive to light of the violet and blue spectral regions. I have further increased the effective contrast between the yellow target and white paper by providing an optical filter 41, in the path of the light from the source 33, which transmits predominantly light of the violet and blue spectral regions. In this way, when the yellow target 14 passes the scanning held 30, it causes a distinct reduction of the current flowing through the photoelectric cell and thus causes a voltage impulse in the input circuit of the electronic amplifier associated with the photoelectric cell and to be described more fully hereinafter. This voltage impulse produced by the photoelectric cell will thus become an index of the position of the first applied impression 10 just prior to the passing of that portion of the web to the second printing unit 16, 17.

In order to provide a corresponding index of the position of the engraved printing cylinder 17 which may then be accurately electrically compared with the position of the first applied impression indicated by the scanning head 30, I have provided a secondary combined photoelectric and optical system which is illustrated diagrammatically in Fig. 3 and will be referred to hereinafter as the tolerance limit index or detector. It is well understood in commercial multicolor printing that perfect registration of the impressions need not be maintained at all times, but it is entirely satisfactory for most commercial work to maintain the register within predetermined limits depending upon the type of work being printed. These limits may vary from plus or minus 0.005 for so-called process work to plus or minus 0.033 for the printing of labels and the like. Thus, it will be apparent that the position of the impression to be made by the printing cylinder of the second printing cylinder must be maintained within a definite space of predetermined length depending upon the tolerance requirements for the particular printing being done.

Figure 3:
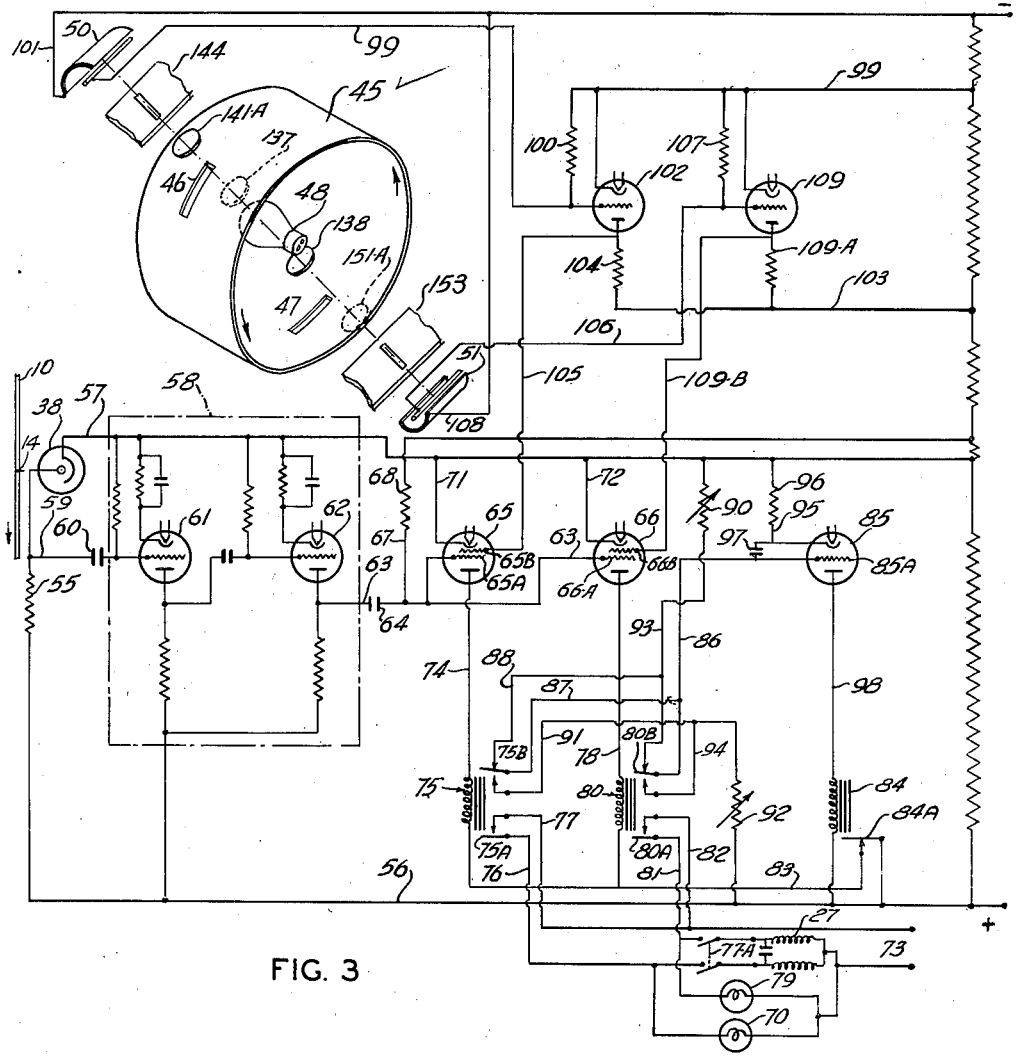
Fig. 3 is a diagrammatic view of the three photoelectric cells and their associated electrical circuits and mechanical and optical equipment.

As shown in Fig. 3, one form of tolerance index or limit detector for determining the forward and rearward limits of tolerance with the desired accuracy, may comprise a cylindrical shell or member 45 that is arranged to be rotated in timed relation with the printing cylinder. Two slots are provided in the surface of this cylindrical member; a first slot 46 for defining the forward limit of tolerance and a second slot 47 for defining the rearward or reverse limit of tolerance. A light source, in the form of a conventional incandescent lamp bulb 48, may be suitably mounted inside the cylindrical member 45 and by means of suitable optical systems which will be described more fully below, may direct a beam of light through the first slot 46 upon a forward photoelectric cell or light sensitive element 50 and through the second slot 47 upon a reverse or rearward photoelectric cell or light sensitive element 51 as the cylindrical member 45 rotates. It will thus be apparent that when said cylindrical member 45 is rotating in a counter-clockwise direction as indicated by the arrow in Fig. 3, the photoelectric cell 50 will be energized during that portion of the revolution in which the light beam may pass to it through the slot 46; there will then be a partial period of the revolution when the light from the source 48 does not reach either photocell; and finally the photoelectric cell 51 will be energized during that portion of the revolution in which the light beam may pass to it through slot 47. Thus, the partial period of rotation of the cylinder 45 between the energization of the photoelectric cells 50 and 51 determines the equivalent tolerance space on the web.

Figure 2:
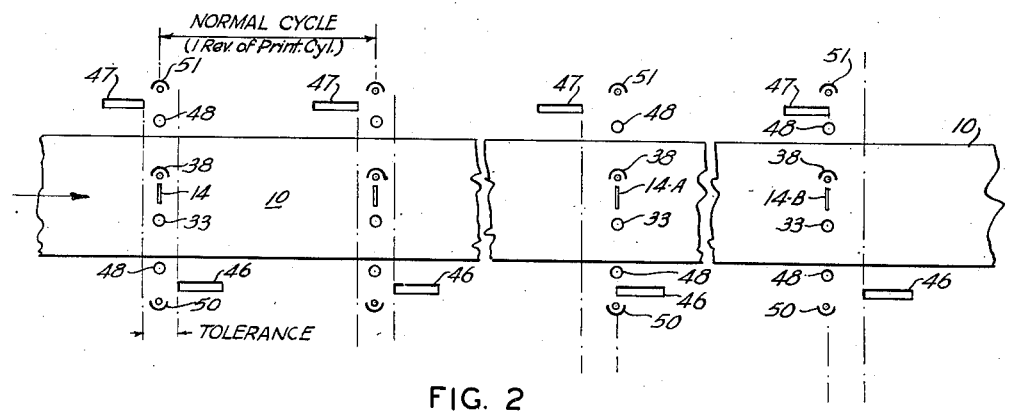
Fig. 2 is a diagrammatic plan view of the web illustrating the principle of operation of my improved apparatus.

In Fig. 2, I have illustrated this photoelectric determination of the position of the first applied impression as compared with the position of the second printing cylinder and the desired forward and rearward limits of tolerance. The diagram shows one normal cycle of revolution of the printing cylinder and the length of web which represents one such normal cycle, and represents a plan view of the web 10 with the target or register mark 14 applied in the middle thereof for convenience. On the upper side of the web, I have shown the position of the slot 47 and its associated photocell 51 for each cycle of revolution; and beneath the web have shown the slot 46 and its associated photocell 50. It will be understood from this diagram that if the photocell 38 is actuated by the passing of the target 14 at a time when neither of the photocells 50 and 51 is actuated, this will determine that the first applied impressions are within the desired limits of tolerance and no correction in register will be required. However, at the righthand portion of the diagram I have shown a register mark 14a so positioned that the photocell 38 would be actuated at the same time as the photocell 50. This would indicate that the first applied impression is too far advanced and a forward correction in register should be effected. Should the target be printed in the position indicated at 14b, the web photocell 38 would be actuated simultaneously with the rearward photocell 51 and would indicate that a rearward correction in register should be made. Thus, whether or not a correction in register should be made will depend upon the phase relationship between the actuation of the web photocell 38 and the illumination of the tolerance limit photocells 50 and 51 associated with the rotating cylindrical member 45.

I have provided improved electrical circuits and apparatus for the three photocells which have been referred to above. These circuits are arranged to indicate and effect the necessary correction in register automatically whenever the actuation of the photocells determines that it is required. That is, whenever the web photocell 38 and the forward tolerance limit photocell 50 are simultaneously actuated, a forward correction in register will be made and indicated, and whenever the web photocell 38 and the rearward tolerance limit photocell 51 are simultaneously energized, a corresponding correction will be made and indicated.

Referring now to Fig. 3 in further detail, it will be observed that the web photocell 38 has its anode connected, through a resistance 55 and a conductor 56, to the positive side of a source of direct current; while the cathode of said web photocell 38 is connected to the same source of direct current through a conductor 57. Impulses from the web photocell 38, created by the passing of the target 14, are amplified by means of a suitable two stage amplifier 58 which is shown within the dot and dash lines in Fig. 3. These impulses are of such a character that the rise and fall in voltage are substantially instantaneous, and therefore no error would be introduced through changes in the amplitude of the impulse as long as the amplitude exceeds the minimum operating value. The amplifier 58, which is of such a character that when an impulse of a given polarity is passed to the input stage thereof an impulse suitably amplified and an exact replica will pass at the output side thereof, is of standard construction and need not therefore be described in detail. Thus, a conductor 59, having one end thereof connected between the resistance 55 and the anode of the photocell 38 and having a suitable condenser 60 interposed therein, connects said photocell with the grid of a suitable electric valve or vacuum tube 61 which constitutes the first stage of amplification of the two stage amplifier 58 and may be the part of amplifying equipment 40 included in the web scanning head. The anode of the valve 61 is coupled to the grid of a second electric valve or vacuum tube 62 which constitutes the second stage of amplification. The anode of the second valve 62 is arranged to pass the amplified pulse through a conductor 63, having a suitable condenser 64 therein, to a grid 65A of a first electric control valve 65 and a grid 66A of a second electric control valve 66. These valves 65 and 66 are preferably of the multigrid, hot cathode gas filled type known as thyratron tubes. The grids 65A and 66A are maintained suitably biased negatively by the provision of a conductor 67 having a resistance 68 therein and connected to the source of power at a point more negative than the conductor 57 through which the cathode of each of the valves 65 and 66 is connected by means of conductors 71 and 72, respectively.

It is the purpose of the first valve 65 to control the lighting of a forward indicator lamp 70 and the forward operation of the correcting motor 27, which I have shown in Fig. 3 as a single phase capacitor type connected to a suitable source of alternating current 73. Consequently, the anode of the first valve 65 is connected through a conductor 74 with a suitable relay or switching device 75 having a lower set of contacts 75A and an upper set of contacts 75B. Contacts 75A are connected to the forward indicator lamp 70 and one side of the motor 27 through a conductor 76 and switch 77A and to the source of alternating current through a conductor 77 so that, when the relay 75 is energized with the switch 77A closed, the indicator lamp 70 will light and the motor 27 will be caused to rotate in a forward direction. However, if switch 77A is open when the relay 75 is energized, the lamp 70 alone will light and the motor will not operate. This is helpful in making the initial settings of the entire apparatus.

Similarly, it is the purpose of the second electric valve 66 to control the lighting of a reverse indicator lamp 79 and the operation of the motor 27 in a reverse direction for effecting rearward corrections in register. Accordingly, the anode of the valve 66 is connected through a conductor 78 with a suitable relay or switching device 80 having a lower set of contacts 80A and an upper set of contacts 80B. Lower contacts 80A are connected with the lamp 79 and the reverse side of the motor 27 by means of a conductor 81 and with the source of alternating current by means of a conductor 82, so that, when the relay 80 is energized with the switch 77A closed, the reverse indicator lamp 79 will light and the motor 27 will be caused to operate in a reverse direction for making a rearward correction in register. However, if switch 77A is open when the relay 80 is energized, the lamp 79 alone will light and the motor will not operate.

It will be noted that each of the relays 75 and 80 associated with the thyratron tubes 65 and 66 is connected to the positive side of the source of power by means of a conductor 83 and the normally closed contact 84A of a relay 84. Since the valves 65 and 66 are of the gas filled type, the flow of current from the anodes thereof will be continuous once it has started and can only be interrupted by a physical interruption of the anode circuit or by reducing the voltage of the anode substantially to zero with respect to the voltage of the cathode. Hence, the indicator lamps 70 and 79 and the motor 27 would normally continue to operate once energized by operation of either of the relays 75 or 80, until the anode circuit of the associated valve 65 or 66, respectively, is physically interrupted, such as by an opening of the contact 84A. In order to control the length of time that the indicator lamps may remain lighted and the motor 27 may operate in either direction once a register correcting action has been initiated, I have provided an electric valve or vacuum tube 85, such as a triode tube which will be hereinafter referred to as the timing triode or valve, in the circuit with the relays 75 and 80. The grid 85A of the timing valve is directly connected with the armature or movable member of the upper contacts 80B by means of a conductor 86 and is directly connected to the armature or movable member of the upper contact 75B by means of a conductor 87. When relay 75 is not energized, the armature for the contact 75B closes a circuit to the more negative side of the power supply through a conductor 88 having a variable resistor 90 therein. When, however, the relay 75 is energized, the contact 75 will be changed so as to close a circuit through a conductor 91 and variable resistor 92 connected to the positive side of the power supply. Similarly, when the relay 80 is not energized, the armature associated with the upper contact 80B will be in an upper position so as to connect the grid 85A of the timing valve with the negative side of the power supply through a conductor 93 which is connected to conductor 88 and the associated variable resistor 90; and when the relay becomes energized the armature of the contact 80B moves to a lower position to close a circuit, through a conductor 94 and the variable resistor 92, to the more positive side of the power supply. The cathode of the timing valve 85 is connected to the negative side of the power supply by means of a conductor 95 having a resistance 96 therein and a suitable condenser 97 is placed across the grid-cathode circuit. The anode of the timing valve 85 is connected by a conductor 98 with the relay 84 and then to the positive side of the power supply. From the foregoing, it will be apparent that when either of the relays 75 or 80 is energized due to the flow of current in the anode circuit of the associated valve 65 and 66, respectively, the voltage on the grid circuit of the timing valve 85 will be made more positive with the result that the condenser 97 will be charged; and after a predetermined time interval depending primarily upon the characteristics of the condenser 97 and the voltage applied thereto, the timing valve 85 will pass plate current from its anode through the conductor 98 and thereby cause the relay 84 to become energized. Energization of said relay 84 will cause the contact 84A to be opened and thereby break or interrupt the anode circuit for whichever of the valves 65 or 66 that has caused the operation.

It will be understood that the interruption of the anode circuit of the valve 65 or 66 that has caused the operation will allow the associated relay 75 or 80 to release and reconnect the grid 85A of the triode 85 to the more negative side of the power supply, thus discharging the condenser 97. After a predetermined time interval, depending upon the characteristics of the condenser 97 and the variable resistor 90, the relay 84 will release and reclose the anode circuits of the valves 65 and 66. During this predetermined time interval between the interruption and reclosing of the anode circuits, it will be apparent that the entire equipment is rendered inactive. Thus, a time delay is introduced between an operation of the correcting mechanism and a subsequent operation in response to a condition of misregister. This time delay is particularly useful in eliminating hunting which would take place in an apparatus where the correction in the relative positions of the element and the web requires a time interval considerably in excess of that during which the correcting mechanism is actuated. This is particularly true in gravure printing presses because of the continuous pressure contact of the printing cylinder with the web.

As has been explained above, the electrical circuits associated with the web photocell 38, the forward photocell 50 and the reverse photocell 51 are such that the web photocell 38 and either of the tolerance limit photocells 50 or 51 must be simultaneously actuated in order to have a correction in register take place. In other words, if the passing of the target 14 causes the web photocell 38 to be actuated within the limits of tolerance when neither the forward or reverse tolerance limit photocells is illuminated, no correction in register is necessary. Thus the anode of the forward tolerance limit photocell 50 is connected to the more positive side of the power supply through a conductor 99 having a resistor 100 therein, and the cathode is connected to the negative side of the power supply through a conductor 101; and when the light passes through the slot 46 and illuminates the photocell 50, it causes a current to flow and produces a voltage drop between cathode and grid of an electric valve 102, across the resistor 100. The anode of the valve 102 is connected to the power supply through a conductor 103 containing a resistor 104, and is also directly connected through a conductor 105 to a second or shield grid 65B of the first valve 65. In the absence of light on the photoelectric cell 50 the grid to cathode voltage of the valve 102 is substantially zero and consequently anode current flows through the resistor 104 producing a voltage drop which through the conductor 105 impresses a large negative voltage, with respect to the cathode, on the shield grid 65B of the valve 65. When the photoelectric cell 50 is illuminated the voltage drop produced across the resistor 100 causes the anode current of the valve 65 to be cut off and the voltage impressed on the shield grid 65B becomes substantially zero.

Similarly, the anode of the rearward photocell 51 is connected to the more positive side of the power supply through a conductor 106, containing the resistor 107, and the cathode is connected to the negative side of the power supply through a conductor 108 connected to conductor 101, and when the light passes through the slot 47 and illuminates the photoelectric cell 51, it causes a current to flow and produces a voltage drop between cathode and grid of a valve 109, across the resistor 107. The anode of the valve 109 is connected to the power supply through the conductor 103 containing the resistor 109A and is also directly connected through a conductor 109B to a second or shield grid 66B of a valve 66. In the absence of light on the photoelectric cell 51, the grid to cathode voltage of the valve 109 is substantially zero and consequently anode current flows through the resistor 109A, producing a voltage drop, which through the conductor 109B impresses a large negative voltage with respect to the cathode on the shield grid 66B of the valve 66. When the photoelectric cell 51 is illuminated the voltage drop produced across the resistor 107 causes the anode current of the valve 109 to be cut off and the voltage impressed on the shield grid 66B becomes substantially zero.

Each of the valves 65 and 66 normally has the grid circuits thereof biased sufficiently negative that they will not pass plate current. Moreover, the construction and arrangement of these valves 65 and 66 is such that when a positive increase in voltage is impressed on either of the grids 65A or 65B or 66A or 66B, such as by the individual actuation of any one of the photocells 38, 50 or 51, no current will flow through the anode circuits of said valves so as to energize the associated relays and the motor 27. However, with a simultaneous actuation of the web photocell 38 and either the forward or reverse tolerance limit photocells 50 and 51, the control and shield grid voltages of either the valve 65 or 66, whichever the case may be, will be raised sufficiently to cause said valve to pass plate current. It will therefore be apparent that an impulse created by the passing of the target 14 before the web photocell 38 at a time when there is no light on either of the tolerance limit photocells 50 or 51, cannot cause either of the valves 65 or 66 to pass plate current because the shield grid bias is maintained in a negative condition.

In order that the continuity of the description of the theory involved in my invention might not be interrupted, I have delayed until now the description of one practical embodiment of the rotating disc 45 and the associated tolerance limit photocells 50 and 51 in a normal printing press having a rotating printing cylinder. It has been explained above, however, that the disc or cylinder 45 is rotated in timed relation with the printing cylinder and provides an index or predetermination of the position of the engraved printing cylinder together with the desired forward and rearward limits of tolerance. As shown in Fig. 1, the shaft of the printing cylinder 17 is provided with an extension 110 of reduced diameter which extends outwardly from the gear 20 and projects into a housing 111 which may be attached in any convenient manner to the side framework of the printing press.

Referring now to Figs. 5, 6, 7 and 8, where the housing 111 and its associated mechanism are shown in detail, it will be seen that the housing 111 comprises a curved top portion 112 having side walls 113, 113, formed integrally therewith and a back wall or portion 114. A front cover member 115 is removably secured to the side and top walls 113, 113, 112 in any convenient manner; and the inside of the housing is divided into an upper section 116 and a lower section 117 by means of a suitable partition 118. The lower section 117 may form a convenient housing for the electrical circuits and equipment shown particularly in Fig. 3 and described above, while the upper section 116 forms the housing for the rotating cylindrical member 45.

Shaft 110 extends into the housing 111 through a hub 120 provided in the rear wall 114, and is rotatably supported in suitable bearings 121 provided in the hub 120 and a suitable reinforcing member or support 122 which permits all operating parts to be removed through the front cover. A flanged disc 123 having a hub 124 is keyed or otherwise secured against rotation on the end of shaft 110 and held in proper position by means of a set screw 125. The flanged portion of the disc 123 is of the same diameter as and forms a suitable support for the cylindrical member 45. Slot 46 for determining the forward limit of tolerance is shown in the upper surface of the cylindrical member 45 in Fig. 6, and slot 47, for defining the rearward limit of tolerance, is shown in the lower surface of said cylindrical member. The light source 48 is mounted in a suitable socket 126 which is secured to the end of a stub shaft 127 which is preferably aligned with shaft 110 so that the light source 48 will be centrally disposed with respect to the cylindrical member 45. Shaft 127 is rigidly supported in the center of a circular shaped flanged disc or dial member 128 having a hub 130 on the inside face thereof and a suitable knob or handle 131 on the outside face thereof so as to render the support for the stub shaft 127 substantially rigid. The peripheral flange 132 of the circular disc or dial 128 engages with a corresponding flange 133 provided on the inner peripheral edge of a circular opening 134 in the front cover member 115. The disc 128 is maintained in proper position in the opening 134 by means of a retaining ring 135 which is secured to the front cover 115 by means of screws 136. This construction provides a suitable track or guideway in the front cover member 115 so that the disc 128 may be rotated therein by turning the knob 131.

Light from the source 48 is projected in a concentrated beam through the slot 46 by means of a suitable lens 137 mounted in a holder 138 which is supported by a suitable angular bracket 140 so shaped that the lens 137 is properly positioned between the source of light 48 and the slot 46. Upon passing through the slot 46 the light has its direction changed 90° so that it passes toward the front of the housing. This is accomplished by means of a suitable prism 141 carried by a bracket 142. The light beam then passes through a second lens 141A and an opening 143 provided in the angular bracket 140, is reduced to suitable proportions and shape by a slit member 144 and directed upon the forward photocell 50. The photocell 50, the bracket 142, angular bracket 140 and slot member 144 are all supported by a horizontally disposed arm 145 provided on an upwardly projecting supporting bracket or arm 146 having a hub 147 by means of which it is rotatably secured upon the stub shaft 127.

An identical optical system is provided for directing a concentrated beam of light from the source 48 through the slot 47. Thus, a lens 148 carried by an angular supporting bracket 150 directs the concentrated beam through the slot 47 upon a prism 151 which changes the direction of the beam 90° and projects it through a lens 151A, an opening 152, slit member 153 and upon the photocell 51. All of these parts are carried on a horizontally disposed arm 154 provided on a supporting bracket 155 extending downwardly from the stub shaft 127, as shown in Fig. 6. It will be understood that the lens 141A forms a magnified optical image of the surface of the cylindrical member 45 in the plane of the slit member 144; and the lens 151A forms an equally magnified optical image of the surface of the cylindrical member 45 in the plane of the slit member 153, thus correspondingly increasing the accuracy and sensitivity of the tolerance and cylinder position index.

In order to adjust the angular position of the photocells 50 and 51 and their associated optical systems with respect to the slots 46 and 47, respectively, so as to change the effective limits of tolerance, the supporting structures 146 and 155 for said photocells and optical systems are provided with downwardly projecting arms 156 and 157, respectively. The lower end of arm 156 is provided with a gear segment 158 (Figs. 5 and 6) which engages with a screw or worm 160 provided on a shaft 161. This shaft is rotatably supported in a suitable bracket 162 which is secured to the circular disc 128 by means of screws 163. Similarly, the lower end of the arm 157 is provided with a gear segment 164 which is actuated by a screw or worm 165 provided on a shaft 166 also rotatably supported in the bracket 162, as best shown in Fig. 7.

Means are provided for simultaneously rotating the shafts 161 and 166 in opposite directions so as to effect a diverging or converging movement of the supporting structures 146 and 155. As shown in Fig. 7, a miter gear 167 is mounted on the end of shaft 161 and registers with a corresponding miter gear 168 mounted on a small shaft 170. A miter gear 171 is also mounted on the end of shaft 166 and engages with a corresponding miter gear 172 mounted on the end of the shaft 170. Shaft 170 is rotatably supported at one end in a suitable bearing provided in a hub 173 formed integrally with the bracket 162 and at its other end in a suitable bearing extending through the disc 128. Outside the disc 128 said shaft 170 may be provided with a suitable actuating knob or handle 174. It will be apparent that by turning the knob 174 in either direction, any desired adjusting movement may be given the supporting structures for the tolerance limit photocells 50 and 51. Although the angular distance between the ends of the slots 46 and 47 is fixed, the relative position of the end of each slot with respect to the associated light beam and photocell may be suitably changed and adjusted by the above described mechanism. Such adjustments increase or decrease the tolerance limits.

I have also provided a mechanism for adjusting the position of both photocells 50 and 51 and their associated optical equipment or system with respect to the cylindrical member 45 so that said photocells may be moved into proper position with respect to the position of the design on the printing cylinder. It is for this purpose that I have mounted the shaft 127 in the disc 128 which is rotatable with respect to the front cover 115 as described above. Large movements of the disc 128 may be made by turning the knob 131. The disc 128 may be locked in its adjusted position by means of a screw 175 having the headed end thereof arranged to ride in a suitable keyway 176 provided in the disc 128 and having a locknut 177 threadedly engaging the outer end thereof.

Finer adjusting movements of the disc 128 may be effected through a downwardly extending adjusting arm 178 suitably attached to the disc 128 and through which the screw 175 extends. This arm is similar to the arms 156 and 157 described above and is provided with a gear segment 180 at its lower end which engages with a screw or worm 181 provided on a shaft 182 rotatably mounted in a supporting bracket 183 secured in any convenient manner to the front cover member 115, as shown in Figs. 5 and 6. A spur gear 184 is mounted on one end of the shaft 182 and engages with a corresponding smaller gear 185 mounted on the end of a shaft 186 which is also rotatably supported in the bracket 183. Shaft 186 is provided with a knob or handle 187 so that it may be turned to effect the desired small adjusting movement of the disc 128. It will be understood that it is through this chain of mechanism that the set screw 175, 177 effects a locking of the disc 128 with respect to the front cover member 115.

From the foregoing description, it is believed that the mechanical and electrical features of my invention will be apparent and their operation will be readily understood. It will also be understood that I have provided a completely automatic mechanism for maintaining register in multiple operations on a moving web which may be easily adjusted for various conditions of operations and once set up for any desired limits of tolerance will function accurately regardless of all changes in the speed of the press above the minimum operating speed. Moreover, due to the construction of the cylindrical member 45 and its associated optical and electrical equipment, and the length and position of the slots 46 and 47 relative thereto, the circuits are active only during that portion of each revolution of the printing cylinder between the beginning of the forward slot and the end of the rearward slot and therefore will not respond to any other design in the web except the desired preconditioned portion of the web, such as the target 14. This thus provides an effective limitation of the portion of each revolution of the printing cylinder or other rotating operating element in which the circuit is responsive to impulses from the web.

Although I have described herein a preferred embodiment of my invention, it will be understood that various changes may be made in the construction and certain features may be employed without others, without departing from my invention or sacrificing any of its advantages.

What I claim is:

1. Register control apparatus for maintaining the operation of a rotating element on a traveling web in register with any prior conditioning of said web, comprising light sensitive means associated with said web for determining the position of a preconditioned portion of said web; light sensitive means for predetermining the forward and rearward limits of tolerance of the position of the preconditioned portion relative to the rotative position of said element; and means for varying the relationship between said element and said web when the position of the preconditioned portion of the web is not within said limits of tolerance.

2. Register control apparatus comprising the combination with an element operating on a strip; of light sensitive means associated with said strip for determining the position of a preconditioned portion of said strip relative to the rotative position of said element; light sensitive means for predetermining the forward and rearward limits of tolerance of the position of said preconditioned portion relative to the position of said element; and means for varying the relationship of said element and strip when the position of said preconditioned portion of the strip is not within said limits of tolerance.

3. Register control apparatus comprising the combination with an element operating on a strip, of light sensitive means associated with said strip for determining the position of a preconditioned portion of said strip relative to the rotative position of said element; light sensitive means for predetermining the forward and rearward limits of tolerance of the position of said preconditioned portion relative to the position of said element; and means for varying the position of said element relative to said strip when the position of said preconditioned portion of the strip is not within said limits of tolerance.

4. Register control apparatus comprising the combination with an element operating on a strip, of light sensitive means associated with said strip for determining the position of a preconditioned portion of said strip relative to the rotative position of said element; light sensitive means for predetermining the forward and rearward limits of tolerance of the position of said preconditioned portion relative to the position of said element; and means for indicating that a correction in register is necessary when the position of said preconditioned portion of the strip is not within said limits of tolerance.

5. Register control apparatus comprising the combination with an element operating on a strip of material, of means for determining the position of a mark on the strip, light sensitive means associated with said element for predetermining the forward limit of tolerance of the rotative position of said element, light sensitive means associated with said element for predetermining the rearward limit of tolerance of the rotative position of said element, and means for varying the relationship between said strip and element when the mark on the strip is not within said forward and rearward limits of tolerance.

6. Register control apparatus comprising the combination with an element operating on a strip of material, of means for determining the position of a mark on the strip, light sensitive means associated with said element for predetermining the forward limit of tolerance of the rotative position of said element, light sensitive means associated with said element for predetermining the rearward limit of tolerance of the rotative position of said element, and means for indicating that a correction in register is necessary when the mark on the strip is not within said forward and rearward limits of tolerance as determined by said light sensitive means.

7. Register control apparatus comprising the combination with an element operating on a strip of material, of light sensitive means controlled by the strip for producing an electrical impulse in accordance with the position of a mark on the strip, light sensitive means for producing an electrical impulse in accordance with the forward limit of tolerance of the position of said element, light sensitive means for producing an electrical impulse in accordance with the forward limit of tolerance of the position of said element, and means for producing a correction in the relationship between said element and strip when the electrical impulse produced by the strip occurs within the duration of either of the other impulses.

8. Register control apparatus comprising the combination with an element operating on a strip of material, of light sensitive means controlled by the strip for producing an electrical impulse in accordance with the position of a mark on the strip, light sensitive means for producing an electrical impulse in accordance with the forward limit of tolerance of the position of said element, and means for producing a correction in the relationship between said element and strip when the electrical impulse produced by the strip occurs within the duration of the other impulse.

9. Register control apparatus comprising the combination with an element operating on a strip of material, of light sensitive means controlled by the strip for producing an electrical impulse in accordance with the position of a mark on the strip, light sensitive means for producing an impulse in accordance with the position of the rearward limit of tolerance of the position of said element, and means for varying the relationship between said strip and said element when the electrical impulse produced by the strip occurs within the duration of the other impulse.

10. Register control apparatus comprising the combination with an element operating on a strip of material, of light sensitive means controlled by the strip for producing an electrical impulse in accordance with the position of a mark on the strip, light sensitive means for producing an impulse in accordance with one limit of tolerance of the position of said element, and means for indicating that a correction in register is required when the electrical impulse produced by the strip occurs within the duration of the other impulse.

11. Register control apparatus comprising in combination, an element operating on a strip of material, light sensitive means actuated by the strip, light sensitive means actuated in accordance with one of the limits of tolerance of the position of said element, electric valve means responsive to the simultaneous actuation of said light sensitive means, and means controlled by said electric valve means for varying the relative positions of said strip and element.

12. Register control apparatus comprising in combination, an element operating on a strip of material, light sensitive means actuated by the strip, light sensitive means actuated in accordance with one of the limits of tolerance of the position of said element, electric valve means responsive to the simultaneous actuation of said light sensitive means, means controlled by said electric valve means for varying the relative positions of said strip and element, and additional valve means for rendering the first mentioned valve means inactive a predetermined time after the simultaneous actuation of said light sensitive means.

13. Register control apparatus comprising in combination, an element operating on a strip of material, light sensitive means controlled by the strip for producing an electrical impulse in accordance with the position of a mark on the strip, light sensitive means for producing an electrical impulse in accordance with the forward limit of tolerance of the position of said element, light sensitive means for producing an electrical impulse in accordance with the rearward limit of tolerance of the position of said element, means for correcting the relative positions of said strip and element, a first electrical valve for controlling the operation of said correcting means in a forward direction, a second electrical valve for controlling the operation of said correcting means in a rearward direction, and circuit means associated with said light sensitive means and said electrical valves, the construction and arrangement of said valves and circuit means being such that said correcting means will only be actuated when the electrical impulse produced by the strip occurs within the duration of either of the other impulses.

14. In a register control apparatus for maintaining the operation of a rotating element on a traveling web in register with any prior operations on said web, a web scanning apparatus for producing an electrical impulse in accordance with the position of a mark on said web, comprising a light source, means for directing light from said source upon the surface of the web, means for modifying the spectral composition of the light, and light sensitive means for producing an impulse each time a mark on the web passes the light directed upon said web, said light sensitive means having such a spectral response curve that there will be a peaked response for light wave lengths from 400–500 millimicrons and substantially no response for light wave lengths above 550 millimicrons.

15. Register control apparatus comprising the combination with an element operating on a strip, of light sensitive means for determining the position of a pre-conditioned portion of said strip relative to the rotative position of said element; light sensitive means associated with said element for predetermining the forward and rearward limits of tolerance of the position of said preconditioned portion relative to the position of said element; means for varying the relationship between said element and said strip when the position of said preconditioned portion of the strip is not within said limits of tolerance; and means for rendering the apparatus inactive for a predetermined time after the operation of such relationship-varying means.

16. Register control apparatus for maintaining the operation of a rotating element on a traveling web in register with any prior conditioning of said web, comprising light sensitive means associated with said strip for determining the position of a preconditioned portion of said web; light sensitive means for predetermining the forward and rearward limits of tolerance of the rotative position of said element relative to the position of the preconditioned portion of said web; and means for varying the relationship between said element and said web when the rotative position of said element is not within said limits of tolerance.

17. Register control apparatus comprising the combination with an element operating on a strip of material, of means for determining the position of a mark on the strip, light sensitive means associated with said element for predetermining the forward limit of tolerance of the rotative position of said element, light sensitive means associated with said element for predetermining the rearward limit of tolerance of the rotative position of said element, and means for varying the relationship between said strip and element when the rotative position of said element is not within the forward and rearward limits of tolerance.

18. Register control apparatus for maintaining the operation of a rotating element on a traveling web in register with any prior conditioning of said web, comprising a first light sensitive means for determining the position of a preconditioned portion of said web; a second light sensitive means for predetermining the forward and rearward limits of tolerance of the position of the preconditioned portion relative to the rotative position of said element, said second light sensitive means including a slotted member associated with said rotating element and constructed and arranged so that said second light sensitive means is active only within a predetermined angle of revolution of said element as determined by said slotted member whereby any impulses produced by the first light sensitive means outside of said predetermined angle of revolution are ineffective; and means for varying the relationship between said element and said web when the position of the preconditioned portion of the web is not within said limits of tolerance.

MORRIS SORKIN.